United States Patent [19]

Shtipelman et al.

[11] Patent Number: 5,138,605
[45] Date of Patent: Aug. 11, 1992

[54] LOW-PROFILE RADIAL ACCESS MECHANISM FOR DISK RECORDING/PLAYBACK APPARATUS, WITH OPTICAL HEAD MOUNTED ON A CARRIAGE

[75] Inventors: Boris A. Shtipelman, Rochester; Paul D. Heppner, Hilton; Albert A. Halter, Fairport, all of N.Y.

[73] Assignee: Eastman Kodak Company, Rochester, N.Y.

[21] Appl. No.: 593,846

[22] Filed: Oct. 5, 1990

[51] Int. Cl.$^5$ ............................ G11B 3/36; G11B 5/55; G11B 7/12

[52] U.S. Cl. .................................... 369/215; 369/219; 369/249; 360/106

[58] Field of Search ............... 369/215, 219, 220, 221, 369/244, 249; 360/104, 105, 106

[56] References Cited

U.S. PATENT DOCUMENTS

| | | | |
|---|---|---|---|
| 4,414,594 | 11/1983 | Farmer et al. | 360/106 |
| 4,415,941 | 11/1983 | Gibeau et al. | 360/106 |
| 4,570,249 | 2/1986 | Malissin et al. | 369/219 X |
| 4,698,798 | 10/1987 | Faber et al. | 369/219 |
| 4,740,946 | 4/1988 | Yumura et al. | 369/219 |
| 4,763,314 | 8/1988 | McCaslin et al. | 369/249 |
| 4,823,219 | 4/1989 | Ueda et al. | 369/220 X |
| 4,823,336 | 4/1989 | Inada et al. | 367/215 |

Primary Examiner—Stuart S. Levy
Assistant Examiner—Joseph A. Rhoa
Attorney, Agent, or Firm—William W. Holloway

[57] ABSTRACT

A low-profile radial access mechanism for controlling the radial position of a read/write head relative to a rotating data storage disk (e.g. optical, magneto-optical and magnetic disks). Such mechanism has a carriage (10) which supports a plurality of bearings (11) on its opposing sides. The bearings engage a pair of space parallel rods (21, 31) to guide the carriage along a rectilinear path. Each rod is made of a ferromagnetic material and forms part of the flux-carrying structure of one of a pair of separate electromagnetic linear motors (20, 30). One of the two flux-carrying structures is movable relative to the other to preload the bearings against the guide rods. According to a preferred embodiment, the pair of linear motors share the windings of a single coil (22) carried by the carriage, such windings being physically distributed as to accommodate an exact constraint arrangement provided by the bearings. Preferably, the bearings and coil are located and configured so that the center of mass of the carriage is located along the line of force exerted on the carriage by the linear motors.

8 Claims, 4 Drawing Sheets ial access mechanism embodying the invention in combination with a rotating data storage disk D. A portion of the disk is cut away to expose the underlying mechanism. Disk D is adapted to be rotated by a spindle motor 3 and may be, for example, of the optical or magneto-optical varieties with its data being recorded along closely spaced tracks located between the outer and inner tracks $T_o$ and $T_i$, respectively. Access to the data recorded along a desired track is achieved by advancing a transducer 4 along a radial path which crosses each of the data tracks. This transducer may take the form of a conventional optical or magneto-optical write/read head, including a laser, certain optical elements, focus and fine tracking servo systems and associated photosensors and electronics. Preferably, however, it comprises only certain optical elements (e.g. an objective lens, 90° turning mirror, and quarter-wave plate) of a so-called "split head" design in which the remaining elements of the head are mounted in a housing 5 which is kept stationary. In such case, of course, housing 5 is optically coupled to the transducer.

LOW-PROFILE RADIAL ACCESS MECHANISM FOR DISK RECORDING/PLAYBACK APPARATUS, WITH OPTICAL HEAD MOUNTED ON A CARRIAGE

BACKGROUND OF THE INVENTION

The present invention relates to the field of data recording and playback and, more particularly, to improvements in apparatus for controlling the radial position of a write/read head relative to a data storage disk so that information can be written on (or read from) a desired data track.

Heretofore, a variety of radial access mechanisms have been proposed and utilized for controlling the radial position of a write/read head relative to the recording surface of a data storage disk (e.g. optical, magneto-optic and magnetic disks). Typically, such mechanisms function to advance the head along a straight or arcuate trajectory in a plane parallel to the plane of disk rotation. In providing a linear head trajectory, many different voice-coil linear actuators designs have been used.

In U.S. Pat. No. 4,763,314 issued to McCaslin et al, there is disclosed a moving coil linear actuator for controlling the radial position of a write/read head in an optical disk recording apparatus. The actuator comprises a carriage having six roller bearings which are positioned to engage and be guided by a pair of spaced, parallel rods rigidly mounted on a support plate. The roller bearings and rods cooperate to provide an "exact constraint" whereby the motion of the carriage is constrained to a rectilinear path. Though not expressly disclosed, it appears that the bearings themselves are preloaded within the carriage so as to exert equal forces on the support rods. While it is possible to preload each bearing in a relatively large access mechanism, such a preloading scheme is increasingly problematic as the size of the mechanism is miniaturized. Also in this actuator design, the carriage is driven by two discrete linear motors, each comprising its own separate moving coil. The need for two coils can complicate the task of exerting a uniform force on the carriage in a direction parallel to the intended direction of travel.

SUMMARY OF THE INVENTION

In view of the foregoing discussion, an object of this invention is to provide a more simple and reliable scheme for preloading the roller bearings of a radial access mechanism of the above-type. According to the invention, preloading of a plurality of roller bearings rotatably supported by a carriage or payload is achieved by movably mounting one of the two spaced, parallel rods which function to guide the carriage for movement along a rectilinear path. Also, in accordance with a preferred embodiment of the invention, such spaced, parallel rods comprise a portion of the flux-carrying structure of a pair of linear motors which share a common moving coil. The windings of such coil are distributed to accommodate an "exact constraint" provided by the roller bearings, as well as to assure that the center of mass of the carriage is located along the line of force exerted on the carriage by the linear motors.

The invention and its advantages will be better understood from the ensuing detailed description of a preferred embodiment, reference being made to the accompanying drawings.

DETAILED DESCRIPTION OF PREFERRED EMBODIMENTS

Figure 1:
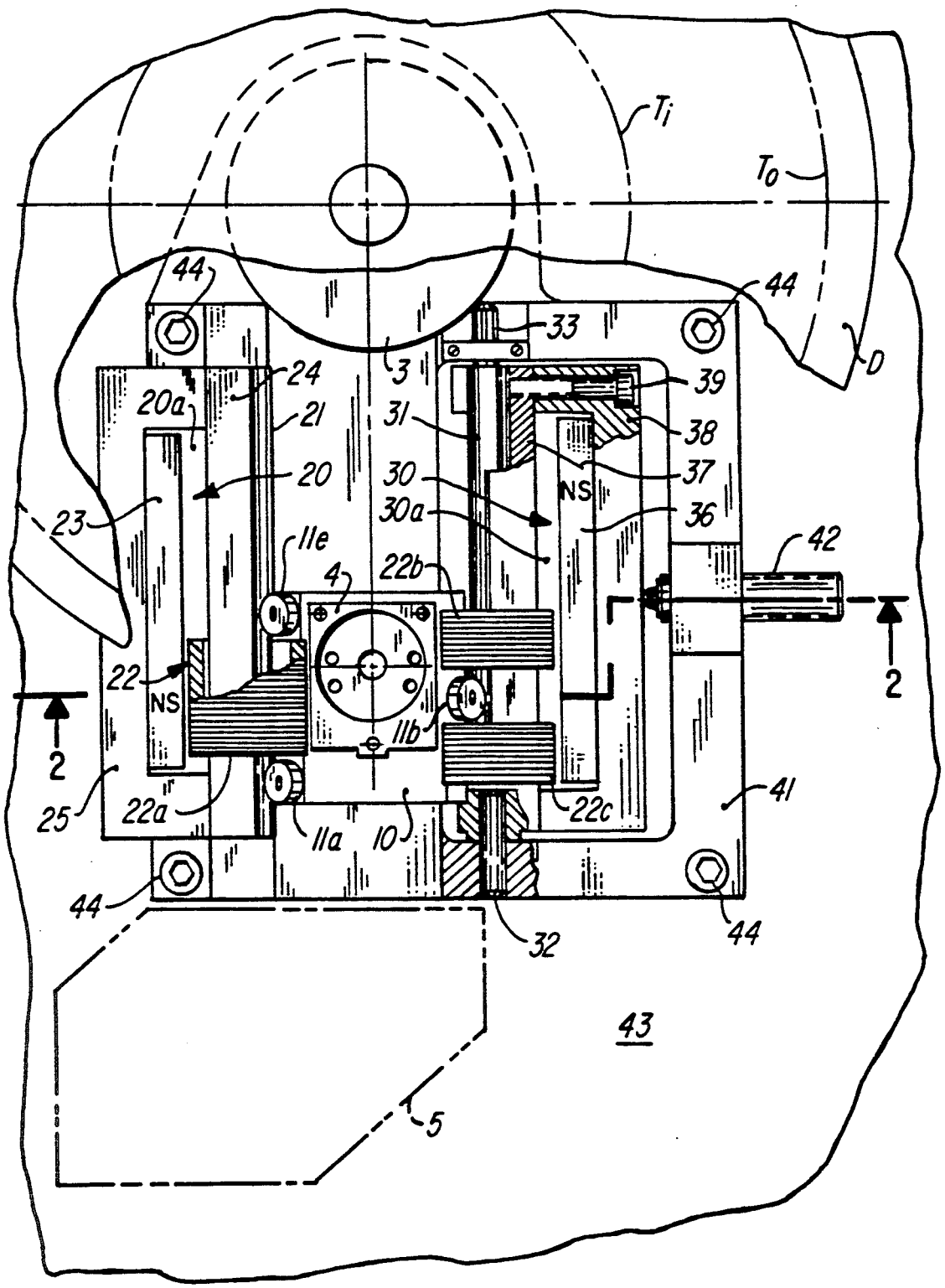
FIG. 1 is a top plan view of a radial access mechanism embodying the invention.
Figure 2:
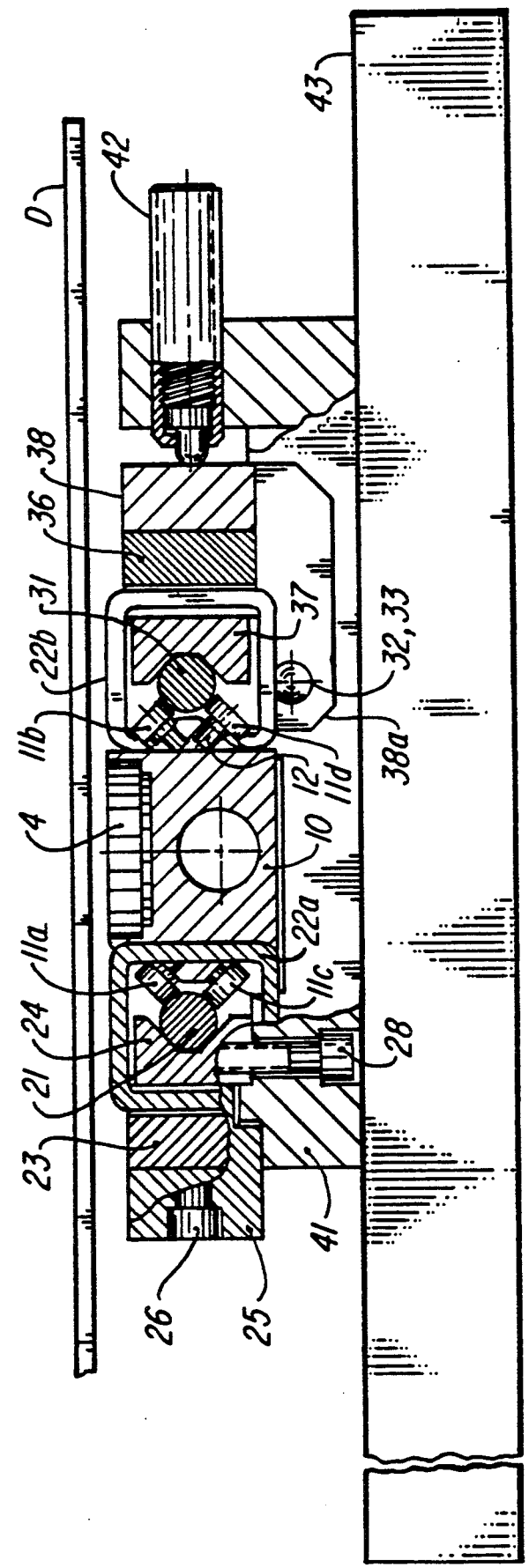
FIG. 2 is a sectional view of the FIG. 1 apparatus taken along the section line 2—2.

Referring to the drawings, FIGS. 1 and 2 illustrate a radial access mechanism embodying the invention in combination with a rotating data storage disk D. A portion of the disk is cut away to expose the underlying mechanism. Disk D is adapted to be rotated by a spindle motor 3 and may be, for example, of the optical or magneto-optical varieties with its data being recorded along closely spaced tracks located between the outer and inner tracks $T_o$ and $T_i$, respectively. Access to the data recorded along a desired track is achieved by advancing a transducer 4 along a radial path which crosses each of the data tracks. This transducer may take the form of a conventional optical or magneto-optical write/read head, including a laser, certain optical elements, focus and fine tracking servo systems and associated photosensors and electronics. Preferably, however, it comprises only certain optical elements (e.g. an objective lens, 90° turning mirror, and quarter-wave plate) of a so-called "split head" design in which the remaining elements of the head are mounted in a housing 5 which is kept stationary. In such case, of course, housing 5 is optically coupled to the transducer.

According to the invention, radial movement of transducer 4 along a rectilinear path is produced by a radial access mechanism comprising a moving carriage 10 which rotatably supports six roller bearings 11a–11f, each being mounted on a stubbed shaft 12 pressed into the carriage frame. Top bearings 11a, 11b and 11e can be seen in FIG. 1. Bottom bearings 11c and 11d are shown in FIG. 2. Not shown in the drawings is bearing 11f which is located under bearing 11e, as viewed in FIG. 1. In relation to a vertical line perpendicular to the direction of carriage travel, each bearing is oriented at a 45 degree angle. By placing four bearings in the corners of the carriage frame on one of its sides with two additional bearings in the middle of its opposite side, the moving carriage is "exactly contained" to only one degree of freedom while it travels linearly in the longitudinal direction, being guided by two parallel steel rods 21 and 31.

Linear movement of carriage 10 is controlled by two moving coil-type linear motors 20 and 30 located on opposite sides of the carriage. Motors 20 and 30 share an electrically energizable coil 22 having three rectangularly shaped coil portions 22a, 22b and 22c. Motor 20 comprises coil portion 22a and a permanent magnet 23 which is poled to produce a magnetic field transverse to the coil axes. Coil portion 22a surrounds a metal core 24 of high magnetic permeability and is rigidly connected to the left side of the carriage (as viewed in FIG. 1) between bearings 11a and 11e. Core 24 along its length is furnished with a V-groove in which the carriage-guide rod 21 is placed. As a result, rod 21 becomes an integral part of the flux-carrying structure of motor 20. The magnetic flux path of motor 20 is enclosed through a C-shaped metal bracket 25 of high magnetic permeability. The whole structure is kept together by screws 26 (see FIG. 2) and is rigidly connected to the base plate 41 with screws 28.

Figure 3:
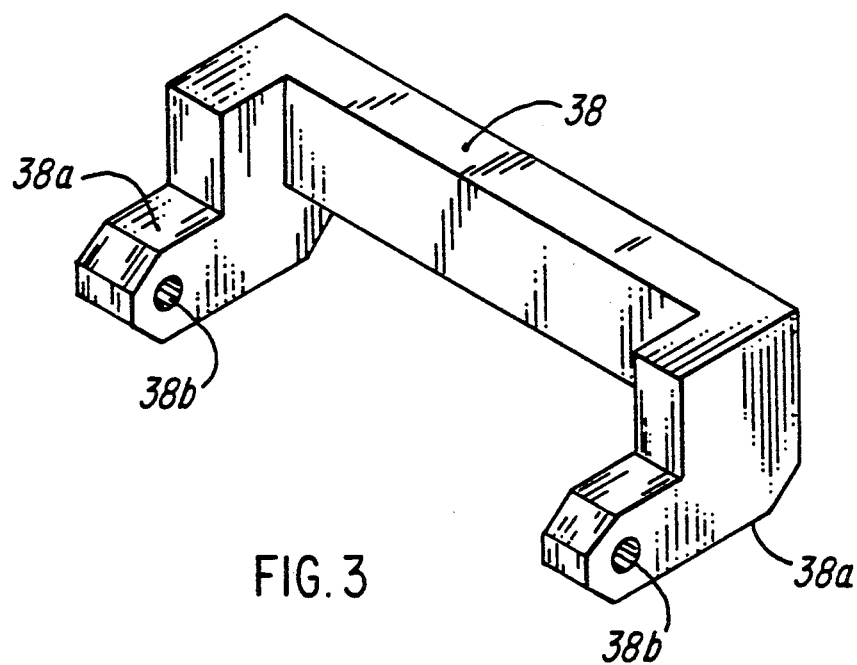
FIG. 3 is a perspective view of a portion of the apparatus shown in FIGS. 1 and 2.

The second linear motor 30, unlike motor 20, is not mounted rigidly on plate 41. Instead, it is pivotally supported by two pins 32 and 33 which are rigidly mounted on a base plate 41 and extend toward each other. Motor 30 comprises two rectangularly shaped coil portions 22b and 22c, and a permanent magnet 36 which produces a magnetic field transverse to the coil axes. The combined length of coil portions 22b and 22c is equal to the length of coil portion 22a so that forces exerted by each motor are the same, assuming that flux densities in air gaps 20a and 30a of motors 20 and 30 have equal values. Coil portions 22b and 22c surround a metal core 37 of high magnetic permeability and are rigidly connected to the right side of the carriage (as viewed in FIG. 2) on opposite sides of bearings 11b and 11d. Core 37 is furnished along its length with a V-groove in which rod 31 is placed. As a result, rod 31 becomes an integral part of the flux-carrying structure of motor 30. The magnetic flux path of motor 30 is enclosed through a C-shaped metal bracket 38 of high magnetic permeability. The whole structure is kept together by screws 39. As mentioned above, the entire flux-carrying structure of motor 30 is supported for pivotal movement by a pair of pins 32 and 33 which are positioned in holes 38b formed in two tabs 38a located at each end of bracket 38. The tabs can be seen in FIG. 3 where a perspective view of bracket 38 is illustrated. This arrangement allows motor 30 to pivot about these pins. Such pivot movement is executed by an adjustable spring plunger 42 mounted in plate 41 resulting in a preload of all the carriage bearings as rod 31 is pushed against bearings 11b and 11d.

Base plate 41 is machined in one set-up and provides proper location for each of the two voice coil motors and the disk spindle motor 3. This decreases time-consuming adjustments of the head position in relation to disk D. The whole spindle and radial access mechanism subassembly mounted on plate 41 is connected to the drive housing 43 with screws 44.

Figure 4:
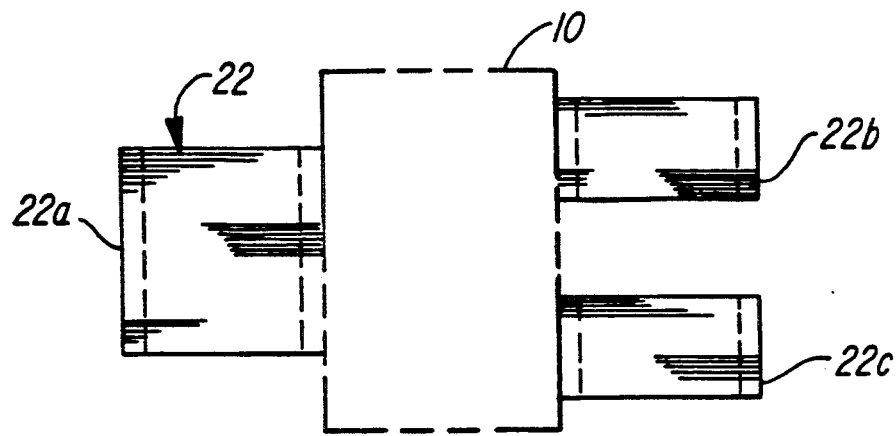
FIGS. 4-6 are the respective top, end, and bottom views of the moving coil used in the FIG. 1 apparatus.
Figure 5:
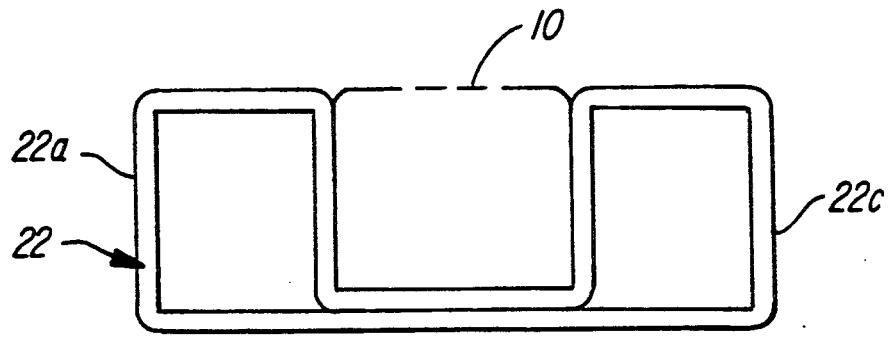
Figure 6:
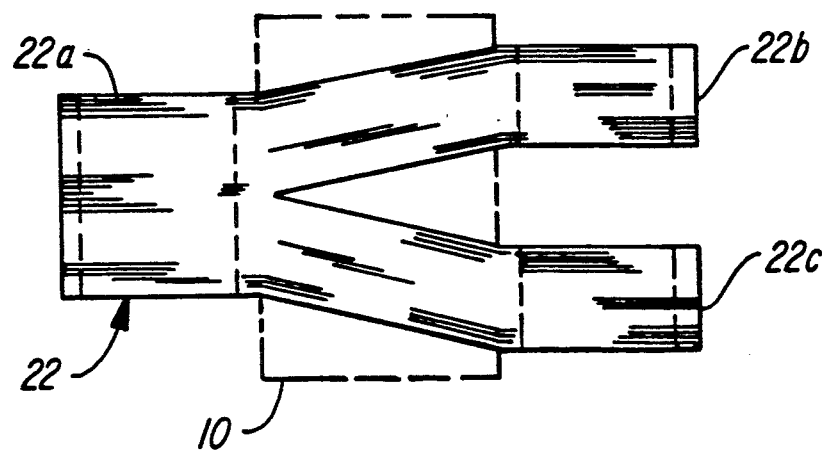

To eliminate any torque applied to the carriage around a vertical axes parallel the the axes of disk D, motors 20 and 30 must develop equal forces. This is achieved by connecting all three coil portions in series so that the same current is passing through their windings. Preferably, coil portions 22a, 22b and 22c are taken into account as three parts of a single coil, the windings of such coil being distributed as illustrated in FIGS. 4, 5 and 6. Here, coil 22 has a continuous winding and is configured in such a way so that it embraces carriage 10 leaving all six bearings unobstructed.

Compared to the aforementioned prior art mechanism, the radial access apparatus of the invention is particularly advantageous from the following standpoints:

a) the moving portion of the mechanism and the forces developed by the voice coil motors are well balanced since their coils are centrally located in relation to the carriage; hence, dynamic behavior of the mechanism is greatly improved and a resonance free motion can be achieved in a wide frequency range up to 12 kHz;

b) the mechanism is quite miniature due to the fact that the carriage suspended by six exactly constrained roller bearings is supporting a small number of head elements and no bearing preload means are provided on the carriage. (As noted, the preload is executed when one of the guiding rods and its associated magnetic structure is pressed against the bearings);

c) positioning of the head assembly in relation to the disk spindle and their adjustments are greatly simplified since those elements are mounted on the same base plate which can be machined in one set-up with all required tolerances provided by the machining process.

The invention has been described in detail with particular reference to a certain preferred embodiment thereof, but it will be understood that variations and modifications can be effected within the spirit and scope of the invention.

We claim:

1. Apparatus for selectively positioning a carriage at a desired location along a rectilinear axis, said apparatus comprising;

(a) a support plate spaced from said axis; (b) first and second linear motors supported by said support plate and positioned on opposite sides of said axis, each of said motors comprising (i) an elongated rectilinear permanent magnet for producing a magnetic field in a direction perpendicular to said axis, and (ii) an associated elongated ferromagnetic member arranged parallel to and spaced from said permanent magnet by an air gap, said ferromagnetic member being magnetically coupled to said permanent magnet to provide a return path for magnetic flux emanating from said permanent magnet;

(c) bearing means supported by and arranged on opposite sides of a carriage, said bearing means being adapted to engage and be slidably supported by the ferromagnetic members of said linear motors when such carriage is predeterminedly positioned on said axis between said linear motors;

(d) electrically energizable coil means rigidly mounted on said carriage, said coil means having coil portions positioned in each of the air gaps of said linear motors, wherein said coil means comprises a single coil having a plurality of windings; and (e) mounting means for mounting said first and second linear motors for relative movement on said support plate, said mounting means comprising (i) means for movably supporting said second linear motor for movement toward and away from said first linear motor; and (ii) means for urging said second linear motor towards said first linear motor, wherein urging said second linear motor toward said first linear motor causing said ferromagnetic members of said linear motors to load said bearing means of carriage, said bearing means exerting substantially equal pressures on said ferromagnetic members, wherein said bearing means includes three pairs of roller bearings, two of said pairs being positioned to engage the ferromagnetic member of one of said linear motors at spaced locations along the length thereof, and the other pair engaging the ferromagnetic member of the other of said linear motors at a location opposite a point midway between said spaced locations, and wherein the windings of said coil means are distributed so that all windings are located between said two of said pairs of roller bearings, and so that one-half of said windings are located on opposite sides of said other pair of said roller bearings.

2. The apparatus as defined by claim 1 wherein said second linear motor is pivotally mounted on said support plate.

3. The apparatus as defined by claim 1 wherein each of said elongated ferromagnetic members comprises a steel rod of circular cross-section.

4. The apparatus as defined by claim 1 wherein each of said elongated ferromagnetic members is of a two-piece construction conprising a steel rod of circular cross-section and an elongated magnetically-permeable member having a groove for receiving said rod.

5. Radial access apparatus for radially positioning an objective lens of an optical read/write head of an optical recording apparatus relative to a desired track on a rotating data storage disk, said radial access apparatus being positioned along a rectilinear axis, said radial access apparatus comprising:

(a) a carriage for supporting such lens;

(b) a planar support plate disposed in a plane parallel to an intended plane of disk rotation;

(c) first and second linear motors supported by said support plate and positioned on opposite sides of said axis, each of said motors comprising (i) an elongated rectilinear permanent magnet for producing a magnetic field in a direction perpendicular to said axis, and (ii) an associated elongated ferromagnetic member arranged parallel to and spaced from said permanent magnet by an air gap, said ferromagnetic member being magnetically coupled to said permanent magnet to provide a return path for magnetic flux emanating from said permanent magnet and wherein electrically energizable coil means are rigidly mounted on said carriage, said coil means having a plurality of windings positioned in each of the air gaps of said linear motors;

(d) bearing means supported by and arranged on opposite sides of said carriage, said bearing means including three pairs of roller bearings, two of said pairs of roller bearings being positioned to engage the ferromagnetic member of one of said linear motors at spaced locations along the length thereof, and the other pair engaging the ferromagnetic member of the other of said linear motors at a location opposite a point generally midway between said spaced locations, wherein the windings of said coil means are distributed so that all windings are located between said two of said pairs of roller bearings and so that one-half of said windings are located on opposite sides of said other pair of said roller bearings, said bearing means being adapted to engage and be slidably supported by said ferromagnetic members of said linear motors when said carriage is predeterminedly positioned on said axis, between said linear motors; and (e) mounting means for mounting said first and second linear motors for relative movement on said support plate, said mounting means comprising (i) means for movably supporting said second linear motor for movement toward and away from said first linear motor; and (ii) means for urging said second linear motor towards said first linear motor, wherein urging said second linear motor toward said first linear motor causes said ferromagnetic members of said linear motors to load said bearing means of said carriage, said bearing means exerting substantially equal pressures on said ferromagnetic members.

6. The radial access apparatus of claim 5, wherein said second linear motor is pivotally mounted on said support plate.

7. The radial access apparatus of claim 5, wherein each of said elongated ferromagnetic members includes a steel rod of circular cross-section.

8. The radial access apparatus of claim 5, wherein each of said elongated ferromagnetic members is of a two-piece construction including a steel rod of circular cross-section and an elongated magnetically-permeable member having a groove for said receiving rod.

* * * * *